Aug. 5, 1947.   J. H. ROUSE   2,425,007
MOTOR CONTROL MEANS
Filed Jan. 11, 1945   2 Sheets-Sheet 1
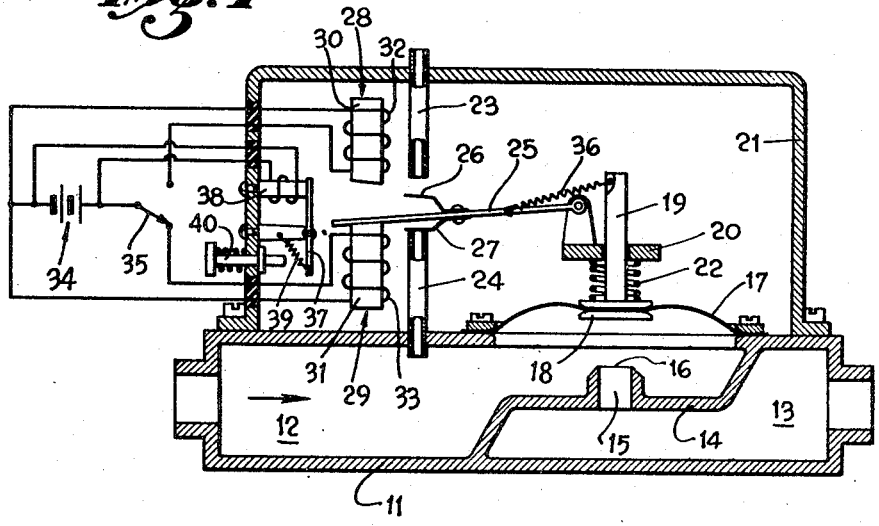
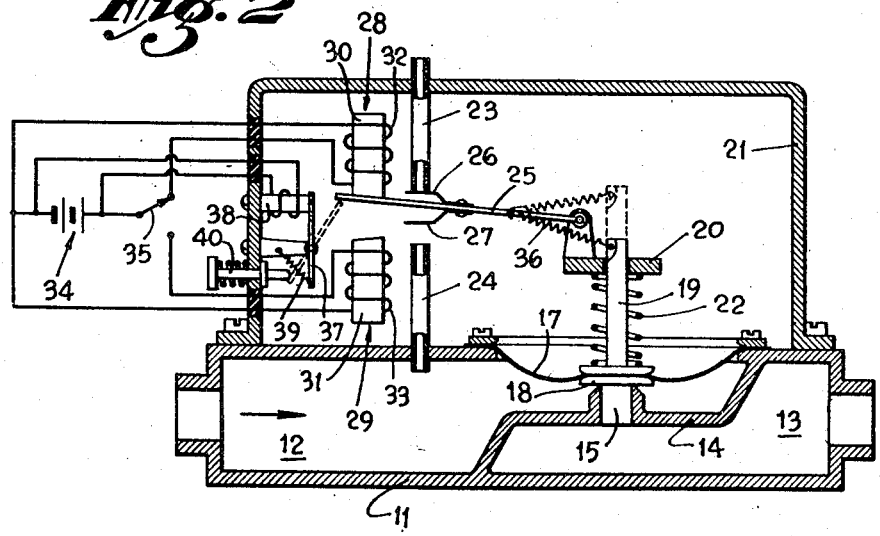
Inventor
John H. Rouse.

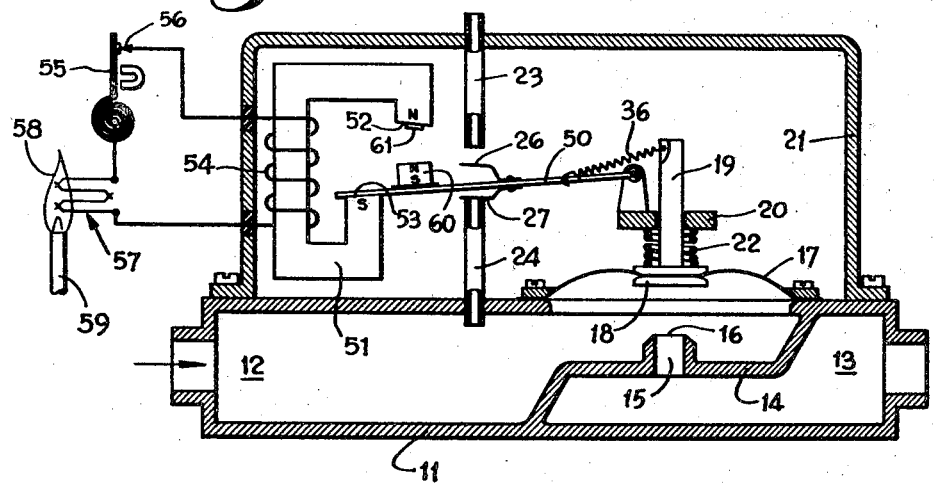
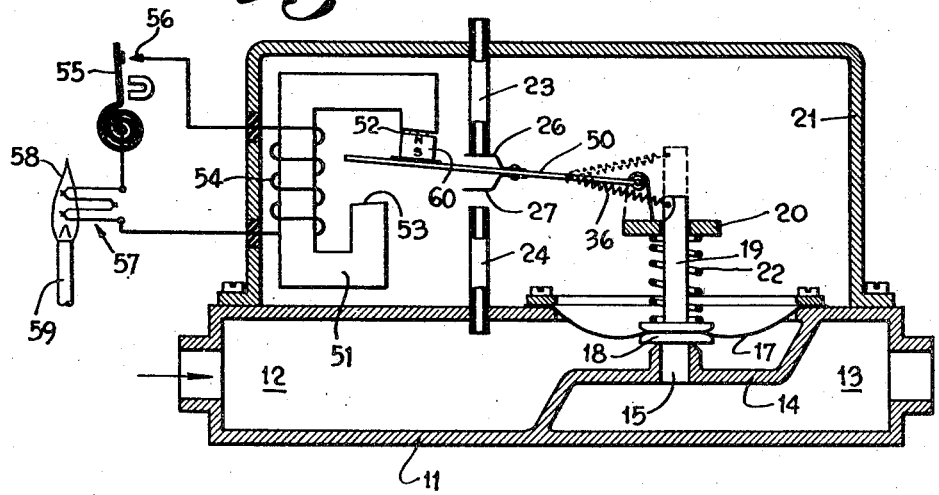

Patented Aug. 5, 1947

2,425,007

UNITED STATES PATENT OFFICE 2,425,007

MOTOR CONTROL MEANS

John H. Rouse, Los Angeles, Calif.

Application January 11, 1945, Serial No. 572,399

12 Claims. (Cl. 121—38)

This invention relates to a control system for motors such as those of the fluid-pressure-operated or electrically-operated type wherein the device for controlling the motor is a pilot valve or a switch, respectively. While the amount of power required for operation of the control device is generally small, it nevertheless may be a factor limiting the utility of the control system when only a relatively weak source of controlling energy is available; as, for example, when this energy is supplied by a thermoelectric generating device of a size adapted for heating by a small flame such as that of an ordinary pilot burner.

It is therefore an object of this invention to reduce the power required for operating the control device by providing a system wherein it is only necessary to hold the control device in its controlling positions, the power for actually moving the control device being derived from the same source of energy which supplies the motor; more specifically the invention contemplates the provision of means, operated by the motor in response to movement of the control device to one controlling position, for so conditioning the control device that, when it is subsequently released, it moves to its other controlling position.

Other objects and advantages of the invention will be found in the description, the drawing, and the claims; and, for full understanding of the invention, reference is to be had to the following detailed description, and accompanying drawing, wherein:

Figures 1 and 2 are similar schematic views of a pilot-valve-controlled fluid-pressure-operated valve and control system embodying the invention, the parts being shown in the figures in different position assumed in operation; and Figures 3 and 4 are views, corresponding to those of Figs. 1 and 2, of the same valve as in Figs. 1 and 2 and a modified form of pilot-valve control means and circuit.

Referring first to Figs. 1 and 2, the numeral 11 indicates a valve casing having an inlet 12 and an outlet 13 separated by a partition 14 having a port 15 around the upper end of which is a valve seat 16. Covering an opening in the top wall of the casing, and secured thereto at its margin, is a flexible diaphragm 17 which carries a closure 18, cooperable with seat 16, and a member 19 which extends upwardly through an opening in a guide bracket 20 attached to the back wall of a housing 21 mounted on top of the valve casing and defining therewith a pressure chamber. Biasing closure 18 downwardly is a compression spring 22.

Within the chamber defined by housing 21 is a three-way pilot valve comprising a pair of pipes 23 and 24, which lead respectively to the atmosphere and to the inlet of the valve, and a cooperating closure arm 25. This arm is pivoted at one end on an extension of the bracket 20 and carries a pair of resilient blade-like closures 26 and 27 which cooperate with the respective inner ends of pipes 23 and 24. The arm 25 is of magnetizable material and is adapted to be held in its controlling positions by a pair of electromagnets 28 and 29 which comprise, respectively, cores 30 and 31, and energizing coil windings 32 and 33. For energizing the electromagnets there is a source of electrical energy 34 which is connectable to the individual coil windings by a switch 35.

With the switch in the position shown in Fig. 1, the electromagnet 29 is energized so that arm 25 is magnetically held in contact with the pole face of core 31; closure 27 then being in tight seating engagement with pipe 24. Urging arm 25 upwardly out of contact with electromagnet 29 is a tension spring 36 connected at one end to the arm and, at its other end, to the member 19. If switch 35 is now moved to its opposite position, as shown in Fig. 2, the arm 25 is released from electromagnet 29 and, under the force of spring 36, moves directly into engagement with the pole face of the upper electromagnet 28 which, since it is now energized, holds the arm in its moved position. With the arm in this position, pipe 24 is uncovered and pipe 23 closed by closure 26 so that fluid from the inlet of the valve flows through pipe 24 into the chamber above the diaphragm and, since it can no longer escape therefrom due to the closing of pipe 23, the fluid pressure above the diaphragm soon becomes the same as that below it and spring 22 is then effective to move the closure 18 to its seated position as shown in Fig. 2. In this movement of the closure, the right-hand end of spring 36 is lowered from its previous position (shown in broken lines in Fig. 2) so that the force of this spring now acts downwardly upon arm 25. If switch 35 is now returned to its previous position as shown in Fig. 1, arm 25 is immediately snapped into its lower position so that pipe 23 is uncovered and pipe 24 closed. Due to the resultant venting of the chamber above the diaphragm, the fluid pressure below the diaphragm becomes effective to move it upwardly to the position shown in Fig. 1 so that the position of spring 36 is again altered to condition arm 25 for return movement when it is subsequently released by deenergization of electromagnet 28. It is thus seen that spring 36 supplies all the energy for moving arm 25, and it is therefore only necessary to releasably hold the arm in its moved positions to effect the desired control of the valve.

If the source 34 should fail or become disconnected so that it were impossible to energize either of the electromagnets, continuous oscillation of the parts would then occur since, as soon as the arm were released from one position, pressure conditions would then be established effective to move member 19 to a position in which spring 36 is effective to return the arm to its previous position. To overcome this deficiency, means are provided for holding the arm in a selected position in the event of failure of the source of control energy. These means comprise a pivoted magnetizable arm 37 which is normally held in the position shown in Fig. 1 by an electromagnet 38 connected directly across the source 34. In the event of failure of the source, arm 37 is released from electromagnet 38 and moves, under the force of a spring 39, to the position shown in broken lines in Fig. 2. With arm 37 in this position, upon termination of the upward movement of arm 25 the same is latched in that position by arm 37; the condition of the pilot valve then being such that the main valve is closed. When the source of electrical energy is restored, arm 37 is returned to its normal magnetically-held position by manual actuation of a reciprocable reset plunger 40.

In the modified embodiment of the invention shown in Figs. 3 and 4, the structure differs from that of Figs. 1 and 2 only in regard to the means employed for holding the pilot-valve arm 50 in its controlling positions; the same numerals as in Figs. 1 and 2 therefore having been applied to the corresponding parts in Figs. 3 and 4. Indicated at 51 is a generally C-shaped electromagnet core which provides an upper and a lower pole face 52 and 53, respectively. Around one arm of core 51 is an energizing coil winding 54 which is connected through a bimetallic thermostat 55 (cooperable with a fixed contact 56) to a thermoelectric generating device indicated at 57 and comprising a pair of thermocouples the hot junctions of which are arranged for heating by the flame 58 of a gas burner 59. As shown in Fig. 3, the control circuit of winding 54 is closed and core 51 therefore energized, so that the arm 50 (of magnetizable material) is held in contact with the lower pole face 53 against the force of spring 36. Insulatingly mounted on arm 50 is a permanent magnet 60 which, when the arm is released from pole face 53 upon deenergization of core 51, is adapted to be brought (by the resultant movement of the arm) into contact with the upper pole face 52 and thus hold the arm in its raised position; the parts then being in the positions shown in Fig. 4. So that the magnetic force between the permanent magnet and the core can be adjusted to a value substantially equal to the electromagnetic force of the core, there is provided a non-magnetic member 61 for adjustably spacing magnet 60 with respect to pole face 52.

When, upon reclosing of the thermostat contacts, the core is energized, permanent magnet 60 is repelled from pole face 52 since, as is indicated by the letters N and S in Fig. 3, the adjacent poles of the electromagnet and core are of the same polarity; arm 50 then returning to its lower position under the force of the conditioning spring 36.

The holding system of Figs. 3 and 4 has certain advantages over that shown in Figs. 1 and 2: one of which is due to the fact that a circuit-controller of the simple open-closed type may be employed in place of the two-position switch of Figs. 1 and 2; another being due to the fact that the arm 50 is held in its selected position by the permanent magnet in the event of failure of the source of controlling energy; as in this instance, if the pilot-burner flame 58 were extinguished.

While this invention has been shown and described, by way of example, in connection with a fluid-pressure-operated valve, it is obvious that it is equally applicable to the control of motors of generally any type, whether energized by fluid pressure, electricity or other source of controllable energy. Further, means other than those disclosed could be employed for holding the control arm in its positions, such as mechanically-operated or electrically-operated latches. However, electromagnetic holding means of the general type disclosed are preferred because of the well-known fact that a magnet is very effective when its cooperating member, or armature, is brought into intimate contact therewith. It will be observed that in the device illustrated the control arm is not only snapped to its position under the force of spring 36 but is therein held by this spring until the member 19 has moved to a position at the opposite side of the pivotal axis of the arm.

The embodiments of my invention herein shown and described are susceptible of still further modification without departing from the spirit of the invention and I intend therefore to be limited only by the scope of the appended claims.

I claim as my invention:

1. In a control system: a motor, a member movable between alternate positions by said motor, an element movable between alternate positions for so controlling operation of the motor that movement of the element to its positions effects movement of said member to corresponding ones of its positions, selectively controllable magnetic means for releasably holding the element in its positions and including a source of energy separate from that for operating said motor, and means operated by movement of the member in response to movement of the element to one of its positions for so conditioning the element that when it is subsequently released it moves to its alternate position.

2. In a control system: a reversible motor, a member movable between two positions by operation of said motor in reverse directions, an element movable in opposite directions between two positions for so controlling the direction of operation of the motor that movement of the element to its positions effects movement of said member to corresponding ones of its positions, selectively controllable magnetic means for releasably holding the element in its positions and including a source of energy separate from that for operating said motor, and means operated by movement of the member in response to movement of the element to one of its positions for so conditioning the element that when it is subsequently released it moves to its opposite position.

3. In a control system: a motor; a member movable by said motor in opposite directions between two positions; an element movable in opposite directions between two positions for so controlling operation of the motor that said member is moved to corresponding ones of its positions; means operated by movement of the member in response to movement of the element to one of its positions for conditioning the element for movement to its opposite position, said conditioning means comprising spring means cooperable with the member and the element and so arranged that in said movement of the member the direction of the force exerted on the element by the spring means is reversed; and magnetic means for holding the element in its positions and including a source of energy separate from that for operating said motor, said magnetic means being selectively controllable to release the element and hold it in the position to which it is then moved under the force of said spring means.

4. In a control system: a motor; a member movable by said motor in opposite directions between two positions; a lever, pivoted for movement in opposite directions between two positions, for so controlling operation of the motor that said member is moved to corresponding ones of its positions; means operated by movement of the lever to one of its positions for conditioning the lever for movement to its opposite position, said conditioning means comprising a spring connected at one end to said lever and at its other end to the member at a point thereon which is at opposite sides of the pivotal axis of the lever when the member is in its respective opposite positions; means for holding the lever in its positions; and means for releasing the lever and for holding it in the position to which it is then moved under the force of said spring.

5. In a control system: a fluid pressure motor, a member movable by said motor in opposite directions between two positions, valve means for controlling operation of said motor, an element movable in opposite directions between two positions for so operating said valve means that movement of the element to its positions effects movement of said member to corresponding ones of its positions, means operated by movement of the member in response to movement of the element to one of its positions for conditioning the element for movement to its opposite position, and magnetic means for holding the element in its positions, said magnetic means being selectively controllable to release the element and hold it in the position to which it is then moved under the influence of said conditioning means.

6. In a control system: a fluid pressure motor, a member movable by said motor in opposite directions between two positions, valve means for controlling operation of said motor, an element movable in opposite directions between two positions for so operating said valve means that movement of the element to its positions effects movement of said member to corresponding ones of its positions, means operated by movement of the member in response to movement of the element to one of its positions for conditioning the element for movement to its opposite position, said conditioning means comprising spring means cooperable with the member and the element and so arranged that in said movement of the member the force exerted on the element by the spring means is reversed, and magnetic means for holding the element in its positions, said magnetic means being selectively controllable to release the element and hold it in the position to which it is then moved under the force of said spring means.

7. In a control system: a fluid pressure motor comprising a partition movable, in the operation of the motor, in opposite directions between two positions; a member carried by said partition and movable in accordance with the movement thereof; a lever, pivoted for movement in opposite directions between two positions, for so controlling operation of the motor that said member is moved to corresponding ones of its positions; means operated by movement of the member in response to movement of the lever to one of its positions for conditioning the lever for movement to its opposite position, said conditioning means comprising a spring connected at one end to said lever and at its other end to the member at a point thereon which is at opposite sides of the pivotal axis of the lever when the member is in its respective opposite positions; means for holding the lever in its positions; and means for releasing the lever and for holding it in the position to which it is then moved under the force of said spring.

8. In a control system: a motor; a member movable by said motor in opposite directions between two positions; an element movable in opposite directions between two positions for so controlling operation of the motor that movement of the element to its positions effects movement of said member to corresponding ones of its positions; magnetic means, including a controllable source of electrical energy, for releasably holding the element in its positions; means operated by movement of the member, in response to movement of the element to one of its positions, for so conditioning the element that when it is subsequently released it moves to its opposite position; and means for holding said element in a selected one of its positions in the event of failure of said electrical source.

9. In a control system: a motor, a member movable between alternate positions by said motor, an element movable between alternate positions for so controlling operation of the motor that movement of the element to its positions effects movement of said member to corresponding ones of its positions, means operated by movement of the member in response to movement of the element to one of its positions for urging the element toward its alternate position, means engageable by the element when it is in said posiitons, means producing force normally capable of holding the element in its positions and acting directly between the element and said engageable means, and means for reducing said holding force to permit movement of the element under the force of said urging means.

10. In a control system: a motor, a member movable between alternate positions by said motor, an element movable between alternate positions for so controlling operation of the motor that movement of the element to its positions effects movement of said member to corresponding ones of its positions, means operated by movement of the member in response to movement of the element to one of its positions for urging the element toward its alternate position, means producing magnetic force normally capable of holding the element in its positions by magnetic attraction, and means for reducing said magnetic holding force to permit movement of the element under the force of said urging means.

11. In a control system: a motor, a member movable between alternate positions by said motor, an element movable between alternate positions for so controlling operation of the motor that movement of the element to its positions effects movement of said member to corresponding ones of its positions, means operated by movement of the member in response to movement of the element to one of its positions for urging the element toward its alternate position, magnetic means providing pole faces cooperable with the element when it is in said positions, means producing magnetic force acting directly between the element and said pole faces and normally capable of holding the element in its positions, said magnetic-force-producing means including a controllable source of electrical energy, and means for so varying said magnetic force as to effect release of the element and movement thereof to its alternate position under the force of said urging means.

12. The combination, as defined in claim 11, wherein said magnetic-force-producing means includes a permanent magnet for holding the element in a selected one of its positions in the event of failure of said electrical source.

JOHN H. ROUSE.

REFERENCES CITED

The following references are of record in the file of this patent:

UNITED STATES PATENTS

| Number | Name | Date |
| --- | --- | --- |
| 1,378,625 | Seator | May 17, 1921 |
| 197,951 | Taylor | Dec. 11, 1877 |
| 382,168 | Lechtenberg | May 1, 1888 |
| 590,862 | Severy | Sept. 28, 1897 |
| 740,117 | Fraley | Sept. 29, 1903 |
| 1,814,608 | Schuh | July 14, 1931 |